(12) United States Patent
Barsheshet et al.

(10) Patent No.: US 10,652,111 B2
(45) Date of Patent: May 12, 2020

(54) METHOD AND SYSTEM FOR DEEP PACKET INSPECTION IN SOFTWARE DEFINED NETWORKS

(71) Applicant: ORCKIT IP, LLC, Newton, MA (US)

(72) Inventors: Yossi Barsheshet, Ashdod (IL); Simhon Doctori, Gan-Yavne (IL); Ronen Solomon, Ranat-Gan (IL)

(73) Assignee: ORCKIT IP, LLC, Dover, DE (US)

( * ) Notice: Subject to any disclaimer, the term of this patent is extended or adjusted under 35 U.S.C. 154(b) by 306 days.

(21) Appl. No.: 15/126,288

(22) PCT Filed: Apr. 21, 2015

(86) PCT No.: PCT/US2015/026869
§ 371 (c)(1),
(2) Date: Sep. 15, 2016

(87) PCT Pub. No.: WO2015/164370
PCT Pub. Date: Oct. 29, 2015

(65) Prior Publication Data
US 2017/0099196 A1    Apr. 6, 2017

Related U.S. Application Data

(60) Provisional application No. 61/982,358, filed on Apr. 22, 2014.

(51) Int. Cl.
*H04L 12/26* (2006.01)
*H04L 12/64* (2006.01)
(Continued)

(52) U.S. Cl.
CPC ........ *H04L 43/028* (2013.01); *H04L 12/6418* (2013.01); *H04L 43/026* (2013.01);
(Continued)

(58) Field of Classification Search
CPC . H04L 43/026; H04L 12/6418; H04L 43/028; H04L 49/70; H04L 69/161
(Continued)

(56) References Cited

U.S. PATENT DOCUMENTS

2010/0208590 A1* 8/2010 Dolganow ............ H04L 43/026
370/235
2010/0212006 A1   8/2010 Dolganow et al.
(Continued)

FOREIGN PATENT DOCUMENTS

EP    2672668 A1    12/2013

OTHER PUBLICATIONS

Supplementary Search Report of EP 15783292 dated Nov. 7, 2017.
(Continued)

*Primary Examiner* — Jae Y Lee
*Assistant Examiner* — Jean F Voltaire
(74) *Attorney, Agent, or Firm* — May Patents Ltd. c/o Dorit Shem-Tov (57) ABSTRACT

A method for deep packet inspection (DPI) in a software defined network (SDN). The method includes configuring a plurality of network nodes operable in the SDN with at least one probe instruction; receiving from a network node a first packet of a flow, the first packet matches the at least one probe instruction and includes a first sequence number; receiving from a network node a second packet of the flow, the second packet matches the at least one probe instruction and includes a second sequence number, the second packet is a response of the first packet; computing a mask value respective of at least the first and second sequence numbers indicating which bytes to be mirrored from subsequent packets belonging to the same flow; generating at least one
(Continued)

mirror instruction based on at least the mask value; and configuring the plurality of network nodes with at least one mirror instruction.

54 Claims, 6 Drawing Sheets

(51) Int. Cl.
*H04L 12/851* (2013.01)
*H04L 12/931* (2013.01)
*H04L 29/06* (2006.01)

(52) U.S. Cl.
CPC .......... *H04L 47/2483* (2013.01); *H04L 49/70* (2013.01); *H04L 69/161* (2013.01)

(58) Field of Classification Search
USPC ....................................................... 370/389
See application file for complete search history.

(56) References Cited

U.S. PATENT DOCUMENTS

| | | |
|---|---|---|
| 2011/0264802 A1 | 10/2011 | Dolganow et al. |
| 2013/0329764 A1 | 12/2013 | Chesla et al. |
| 2014/0052836 A1* | 2/2014 | Nguyen ................ H04L 45/306 709/223 |
| 2015/0124812 A1* | 5/2015 | Agarwal ................ H04L 45/24 370/392 |
| 2016/0020998 A1* | 1/2016 | Bifulco .................... H04L 45/64 370/235 |
| 2016/0197831 A1* | 7/2016 | De Foy ............... H04L 45/7453 370/392 |
| 2016/0219080 A1* | 7/2016 | Huang .................... H04L 63/20 |

OTHER PUBLICATIONS

Seugwon Shin et al, "Fresco: Modular Composable Security Services for Software-Defined Networks", NDSS Symposium 2013, Apr. 23, 2013, pp. 1-16 XP055422187.
International Search Report of PCT/US2015/026869 dated Aug. 6, 2015.
Minlan Yu et al, "Scalable flow-based networking with DIFANE", Proceedings of the ACM SIGCOMM 2010 Conference on Applications, Technologies, Architectures, and Protocols for Computer Communications, New Delhi, India, Aug. 30-Sep. 3, 2010, ACM, pp. 351-362 XP058189957.

* cited by examiner

FIG. 1

| KEY 210 | | | | | DATA 220 | | | | | | |
|---|---|---|---|---|---|---|---|---|---|---|---|
| Client IP address | Server IP address | Client source TCP port | Server destination TCP port | IP protocol number | Flow ID | Client→Server sequence number M | Server→Client sequence number N | state | Creation timestamp | Client→Server Hit counter X [bytes] | Server→Client Hit counter Y [bytes] | Client→Server data buffer | Server→Client buffer | Age bit |
| 192.1.1.1 | 209.1.4.4 | 15431 | 21 | 6 | 1 | 0xf46d5c34 | 0x3c98b9ab | ACK | 15:32:13 | | | | | |

METHOD AND SYSTEM FOR DEEP PACKET INSPECTION IN SOFTWARE DEFINED NETWORKS

CROSS REFERENCE TO RELATED APPLICATIONS

This application claims the benefit of U.S. provisional application No. 61/982,358 filed on Apr. 22, 2014, the contents of which are herein incorporated by reference.

TECHNICAL FIELD

This disclosure generally relates to techniques for deep packet inspection (DPI), and particularly for DPI of traffic in cloud-based networks utilizing software defined networks.

BACKGROUND

Deep packet inspection (DPI) technology is a form of network packet scanning technique that allows specific data patterns to be extracted from a data communication channel. Extracted data patterns can then be used by various applications, such as security and data analytics applications. DPI currently performs across various networks, such as internal networks, Internet service providers (ISPs), and public networks provided to customers. Typically, the DPI is performed by dedicated engines installed in such networks.

A software defined networking is a relatively new type of networking architecture that provides centralized management of network nodes rather than a distributed architecture utilized by conventional networks. The SDN is prompted by an ONF (open network foundation). The leading communication standard that currently defines communication between the central controller (e.g., a SDN controller) and the network nodes (e.g., vSwitches) is the OpenFlow™ standard.

Specifically, in SDN-based architectures the data forwarding (e.g. data plane) is typically decoupled from control decisions (e.g. control plane), such as routing, resources, and other management functionalities. The decoupling may also allow the data plane and the control plane to operate on different hardware, in different runtime environments, and/or operate using different models. As such, in an SDN network, the network intelligence is logically centralized in the central controller which configures, using Open Flow protocol, network nodes and to control application data traffic flows.

Although, the OpenFlow protocol allows addition of programmability to network nodes for the purpose of packets-processing operations under the control of the central controller, the OpenFlow does not support any mechanism to allow DPI of packets through the various networking layers as defined by the OSI model. Specifically, the current OpenFlow specification defines a mechanism to parse and extract only packet headers, in layer-2 through layer-4, from packets flowing via the network nodes. The OpenFlow specification does not define or suggest any mechanism to extract non-generic, uncommon, and/or arbitrary data patterns contained in layer-4 to layer 7 fields. In addition, the OpenFlow specification does not define or suggest any mechanism to inspect or to extract content from packets belonging to a specific flow or session. This is a major limitation as it would not require inspection of the packet for the purpose of identification of, for example, security threats detection.

The straightforward approach of routing all traffic from network nodes to the central controller introduces some significant drawbacks, such as increased end-to-end traffic delays between the client and the server; overflowing the controller capability to perform other networking functions; and a single point of failure for the re-routed traffic.

Therefore, it would be advantageous to provide a solution that overcomes the deficiencies noted above and allow efficient DPI in SDNs.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical nodes of all aspects nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for deep packet inspection (DPI) in a software defined network (SDN), wherein the method is performed by a central controller of the SDN. The method comprises: configuring a plurality of network nodes operable in the SDN with at least one probe instruction; receiving from a network node a first packet of a flow, wherein the first packet matches the at least one probe instruction, wherein the first packet includes a first sequence number; receiving from a network node a second packet of the flow, wherein the second packet matches the at least one probe instruction, wherein the second packet includes a second sequence number, wherein the second packet is a response of the first packet; computing a mask value respective of at least the first and second sequence numbers, wherein the mask value indicates which bytes to be mirrored from subsequent packets belonging to the same flow, wherein the mirrored bytes are inspected; generating at least one mirror instruction based on at least the mask value; and configuring the plurality of network nodes with at least one mirror instruction.

Certain embodiments disclosed herein include a system for deep packet inspection (DPI) in a software defined network (SDN), wherein the method is performed by a central controller of the SDN. The system comprises: a processor; a memory connected to the processor and configured to contain a plurality of instructions that when executed by the processor configure the system to: set a plurality of network nodes operable in the SDN with at least one probe instruction; receive from a network node a first packet of a flow, wherein the first packet matches the at least one probe instruction, wherein the first packet includes a first sequence number; receive from a network node a second packet of the flow, wherein the second packet matches the at least one probe instruction, wherein the second packet includes a second sequence number, wherein the second packet is a response of the first packet; compute a mask value respective of at least the first and second sequence numbers, wherein the mask value indicates which bytes to be mirrored from subsequent packets belonging to the same flow, wherein the mirrored bytes are inspected; generate at least one mirror instruction based on at least the mask value; and configure the plurality of network nodes with at least one mirror instruction.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular nodes may be in plural and vice versa with no loss of generality. In the drawings, like numerals refer to like parts through several views.

Figure 1:
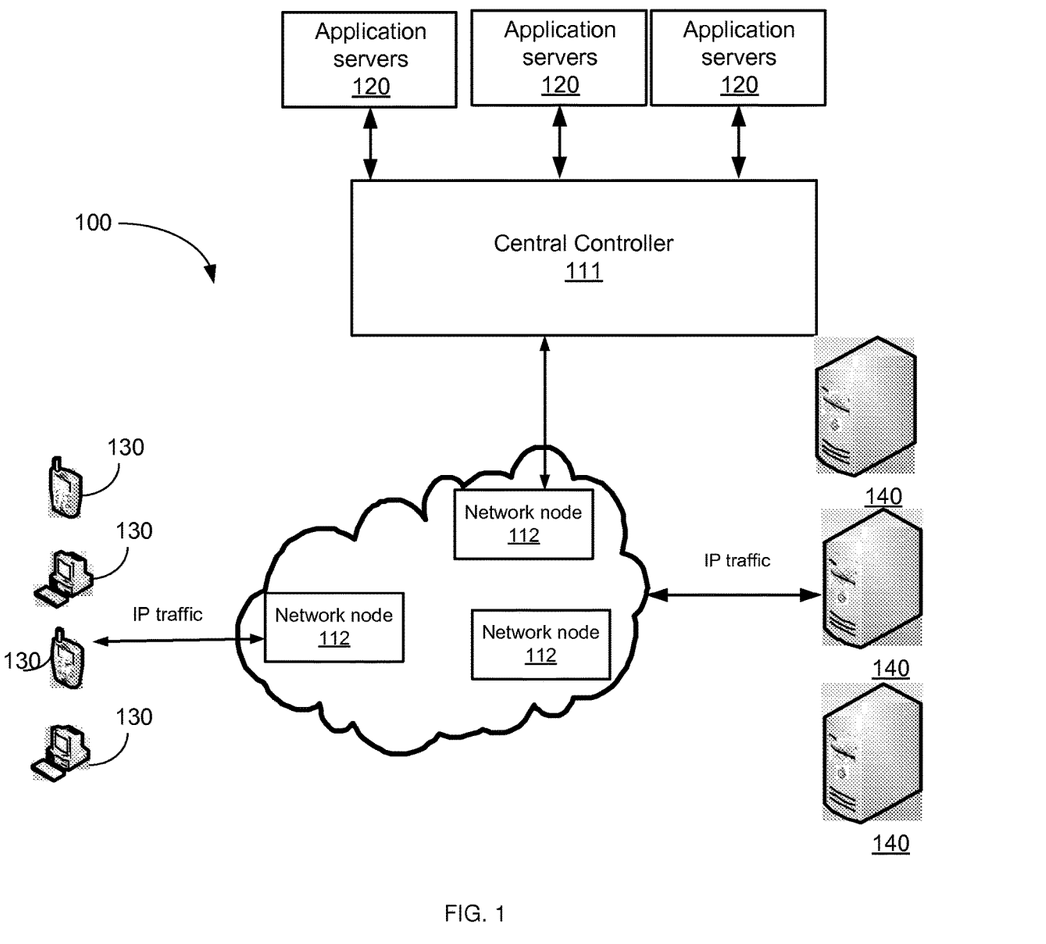
FIG. 1 is a schematic diagram of a network system utilized to describe the various disclosed embodiments.

FIG. 1 is an exemplary and non-limiting diagram of a network system 100 utilized to describe the various disclosed embodiments. The network system 100 includes a software defined network (SDN) 110 (not shown) containing a central controller 111 and a plurality of network nodes 112. The network nodes 112 communicate with the central controller 111 using, for example, an Open Flow protocol. The central controller 111 can configure the network nodes 112 to perform certain data path operations. The SDN 110 can be implemented in wide area networks (WANs), local area networks (LANs), the Internet, metropolitan area networks (MANs), ISP backbones, datacenters, inter-datacenter networks, and the like. Each network node 112 in the SDN may be a router, a switch, a bridge, and so on.

The central controller 111 provides inspected data (such as application metadata) to a plurality of application servers (collectively referred to as application servers 120, merely for simplicity purposes). An application server 120 executes, for example, security applications (e.g., Firewall, intrusion detection, etc.), data analytic applications, and so on.

In the exemplary network system 100, a plurality of client devices (collectively referred to as client devices 130, merely for simplicity purposes) communicate with a plurality of destination servers (collectively referred to as destination servers 140, merely for simplicity purposes) connected over the network 110. A client device 130 may be, for example, a smart phone, a tablet computer, a personal computer, a laptop computer, a wearable computing device, and the like. The destination servers 140 are accessed by the devices 130 and may be, for example, web servers.

According to some embodiments, the central controller 111 is configured to perform deep packet inspection on designated packets from designated flows or TCP sessions. To this end, the central controller 111 is further configured to instruct each of the network nodes 112 which of the packets and/or sessions should be directed to the controller 111 for packet inspections.

According to some embodiments, each network node 112 is configured to determine if an incoming packet requires inspection or not. The determination is performed based on a set of instructions provided by the controller 111. A packet that requires inspection is either redirected to the controller 111 or mirrored and a copy thereof is sent to the controller 111. It should be noted that traffic flows that are inspected are not affected by the operation of the network node 112. In an embodiment, each network node 112 is configured to extract and send only a portion of a packet data that contains meaningful information.

The set of instructions that the controller 111 configures each of the network nodes 112 with include "probe instructions", "mirroring instructions", and "termination instructions." According to some exemplary and non-limiting embodiments, the probe instructions include:

If (TCP FLAG SYN=1) then (re-direct packet to central controller);
If (TCP FLAG SYN=1 and ACK=1) then (re-direct packet to central controller); and
If (TCP FLAG ACK=1) then (forward packet directly to a destination server).

The termination instructions include:
If (TCP FLAG FIN=1) then (re-direct packet to controller);
If (TCP FLAG FIN=1 and ACK=1) then (re-direct packet to controller); and
If (TCP FLAG RST=1) then (re-direct packet to controller).

The TCP FLAG SYN, TCP FLAG ACK, TCP FLAG FIN, TCP FLAG RST are fields in a TCP packet's header that can be analyzed by the network nodes 112. That is, each node 112 is configured to receive an incoming packet (either a request from a client device 130 or response for a server 140), analyze the packet's header, and perform the action (redirect the packet to controller 111 or send to destination server 140) respective of the value of the TCP flag.

The controller 111 also configures each of the network nodes 112 with mirroring instructions with a mirror action of X number of bytes within a packet. The mirrored bytes are sent to the controller 111 to perform the DPI analysis. According to some exemplary embodiments, the set of mirroring instructions have the following format:

If (source IP Address=V1 and destination IP Address=V2 and source TCP port=V3 and destination IP address=V4 and TCP sequence=V5 and TCP sequence mask=V6) then (mirror V7 bytes)

The values V1 through V7 are determined by the controller 111 per network node or for all nodes 112. The values of the TCP sequence, and TCP sequence mask are computed, by the controller 111, as discussed in detail below.

In another embodiment, in order to allow analysis of TCP packets' headers by a network node 112 and tracks flows, new type-length-value (TLV) structures are provided. The TLV structures may be applied to be utilized by an Open-Flow protocol standard as defined, for example, in the OpenFlow 1.3.3 specification published by the Open Flow Foundation on Sep. 27, 2013 or OpenFlow 1.4.0 specification published on Oct. 14, 2013, for parsing and identifying any arbitrary fields within a packet. According to non-limiting and exemplary embodiments, the TLV structures disclosed herein include:

1. TCP_FLG_OXM_HEADER (0x80FE, 2, 1). This TVL structure allows identification of the TCP header flags. The '0x80FE' value represents a unique vendor identification (ID), the value '2' represents a unique Type=2 value for the TLV, and the '1' value is 1-byte total length that stores the TCP flags header.
2. TCP_SEQ_OXM_HEADER (0x80FE, 1, 4). This TLV structure allows identification of the TCP sequence number field. The '0x80FE' value represents a unique vendor ID, the value '1' represents a unique Type=1 value for this TLV, and the value '4' is a 4-byte total length that stores the TCP sequence number.

Figure 2:
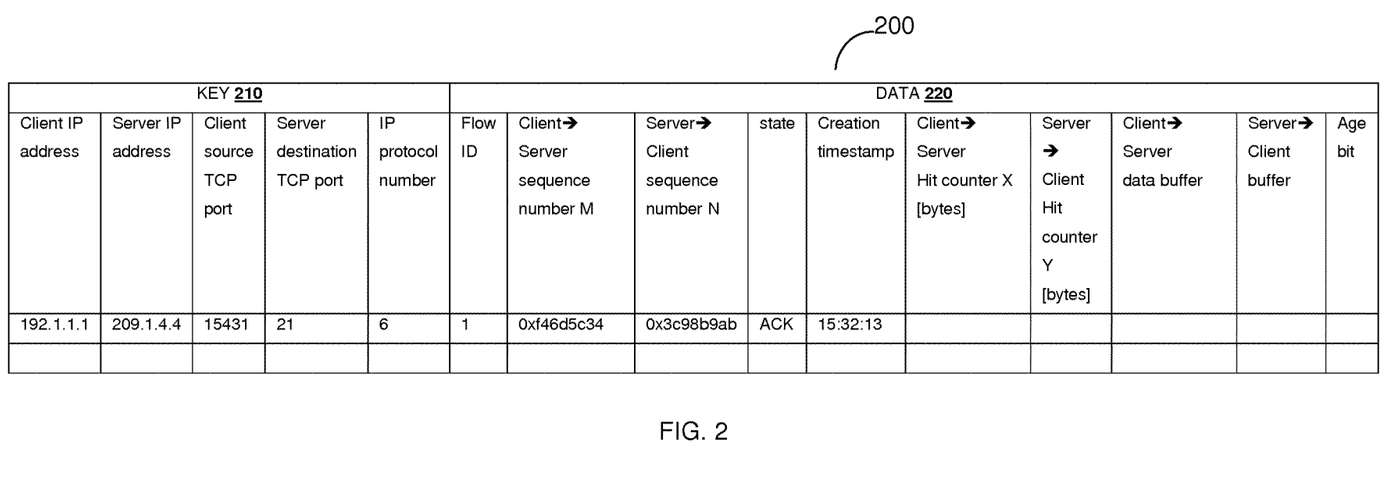
FIG. 2 illustrates is a schematic diagram of a flow table stored in a central controller.

In order to track the flows, the central controller 111 also maintains a flow table having a structure 200 as illustrated in the exemplary and non-limiting FIG. 2. The flow table 200 contains two main fields KEY 210 and DATA 220. The KEY field 210 holds information with respect to the addresses/port numbers of a client device 130 and a destination server 140. The DATA field 220 contains information with respect to a TCP flow, such as a flow ID, a request (client to server) sequence number M, a response (server to client) sequence number N, a flow state (e.g., ACK, FIN), a creation timestamp, a client to server hit counter, server to client hit counter Y [bytes], client to server data buffer, server to client buffer, and an aging bit.

Figure 3:
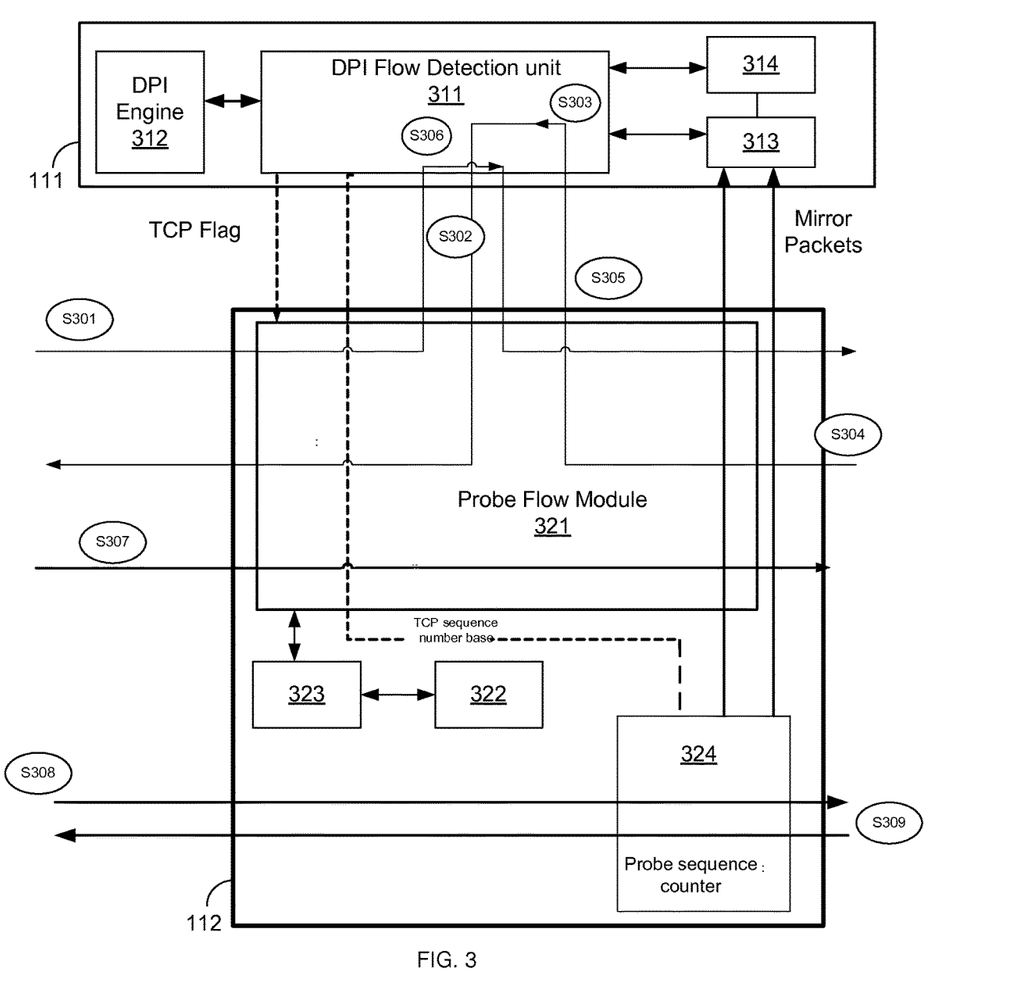
FIG. 3 is a schematic diagram of a system utilized for describing the process of flow detection as performed by a central controller and a network node according to one embodiment.

FIG. 3 shows an exemplary and non-limiting schematic diagram of a system 300 for describing the process of flow detection as performed by the central controller 111 and a network node 112 according to one embodiment. In an exemplary implementation, the central controller 111 includes a DPI flow detection module 311, a DPI engine 312, and a memory 313, and a processing unit 314. The DPI engine 312 in configured to inspect a packet or a number of bytes to provide application metadata as required by an application executed by an application server 120.

According to various embodiments discussed in detail above, the DPI flow detection module 311 is configured to detect all TCP flows and maintain them in the flow table (e.g., table 200). The module 311 is also configured to generate and provide the network logs with the required instructions to monitor, redirect, and mirror packets. The DPI flow detection module 311 executes certain functions including, but not limited to, flow management, computing sequence masks, and TCP flow analysis. These functions are discussed in detail below.

In exemplary implementation, the network node 112 includes a probe flow module 321, a memory 322, and a processing unit 323. The probe flow module 321 is configured to redirect any new TCP connection state initiation packets to the DPI flow detection module 311, as well as to extract several packets from each detected TCP flow and mirror them to the flow detection module 311. In an embodiment, probe flow module 321 executes functions and/or implements logic to intercept TCP flags, redirect packets, and count sequence numbers.

Both processing units 314 and 323 uses instructions stored in the memories 313 and 322 respectively to execute tasks generally performed by the central controllers of SDN as well as to control and enable the operation of behavioral network intelligence processes disclosed herewith. In an embodiment, the processing unit (314, 323) may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The memories 313 and 322 may be implemented using any form of a non-transitory computer readable medium.

Prior to performing the flow detection process the network node 112 is set with the probe instructions, such as those discussed above. Referring to FIG. 3, at S301, a packet arrives from a client (e.g., client 130, FIG. 1) at a port (not shown) at the network node 112. The packet is a TCP packet with a header including the following value [TCP FLAG SYN=1, SEQUENCE=M].

As the header' value matches a redirect action, at S302, the probe flow module 321 redirects the packet to the controller 111, and in particular to the module 311.

In response, at S303, the module 311 traps the packet and creates a new flow-id in the flow table (e.g., table 200) and marks the flow-id's state as 'SYN'. The flow table is saved in the memory 313. The initial sequence from the client to a destination server number equals M and saved in the flow table as well. Then, the packet is sent to the node 112 for further processing.

At S304, a response packet arrives from a destination server (e.g., server 140, FIG. 1) with header value [TCP FLAG SYN=1, TCP FLAG ACK=1, SEQUENCE=N]. The response is received at the node's 112 port. At S305, as the header's value matches a probe instruction, the response packet is sent to the module 311 in the controller 111.

In response, the module 311 traps the packet and searches for a pre-allocated corresponding flow-id in the flow table and updates the respective state as 'SYN/ACK'. The module 311 also stores the initial sequence number of a packet from the server to client as equals to N. This will create a new bi-directional flow-id with M and N sequence numbers identified and the sequence mask logic can be calculated respective thereof.

According to various embodiments, the DPI flow detection module 311 implements or executes a sequence mask logic that computes a mask for the initial trapped sequence numbers (M and N) to be used for a new flow to be configured into the node 112. Specifically, the computed mask is used to define new mirroring instructions to allow mirroring of a number of bytes from the TCP session in both directions. The computed mask value specifies which bytes respective of the correct sequence number would be required to mirror from the TCP session. In an embodiment, the computed value is placed in a mask filed defined by the Open Flow protocol.

The following steps are taken to extract the computed mask value: Compute a temporary mask value (temp_mask_val) as follows:

$$\text{temp\_mask\_val} = M \text{ XOR } (M + \text{TCP\_DATA\_SIZE\_DPI});$$

The value TCP_DATA_SIZE_DPI specifies the number of bytes the node 112 would be required to mirror from the TCP session. In an embodiment, a different value of the TCP_DATA_SIZE_DPI may be set for the upstream and downstream traffic. For example, for an upstream traffic fewer bytes may be mirrored than the downstream traffic, thus the TCP_DATA_SIZE_DPI value for upstream traffic would be smaller than a downstream traffic. The temp_mask_val returns a number where the most significant bit (MSB) set to one indicates the first bit of the mask. Then a sequence MSB is computed as follows:

$$seq\_msb=(int32\_t)msb32(temp\_Mask\_val);$$

The 'msb32' function returns the MSB place of temp_mask_val. Finally, the mask value is computed as follows $$mask=(int32\_t)(0-((0x1<<seq\_msb))).$$

As an example, if the sequence number M is M=0xf46d5c34, and TCP_DATA_SIZE_DPI=16384, then:
temp_mask_val=0xf46d5c34 XOR (0xf46d5c34+16384)= 0xc000
seq_msb=(int32_t)msb32(0xf46d9c34)=16
mask=(int32_t)(0−(0x1<<16))=0xFFFF8000

The mask is defined such that a '0' in a given bit position indicates a "don't care" match for the same bit in the corresponding field, whereas a '1' means match the bit exactly. In above example, all data packets containing sequence number in the range of {0xf46d5c34 to 0xf46d9c34} be mirrored to the controller 111.

Using the computed mask value, the module 311 using a TCP flow analysis logic (not shown) creates the mirroring instructions related to the client and server traffic. One instruction identifies the client to server flow traffic, including the OXM_OF_ _TCP_SEQ to identify the initial sequence number of the flow with the mask_M computed. The action of the flow is to mirror all packets that the instruction applies, which will result in the TCP_DATA_SIZE_DPI number of bytes from the client to server direction to be mirrored to the controller 111. The second instruction identifies the server-to-client flow traffic, including the OXM_OF_TCP_SEQ to identify the initial sequence number of the flow with the mask_N. The action is to mirror all packets that the instruction applies to, which will result in the TCP_DATA_SIZE_DPI number of byte from the server to client direction to be mirrored to the controller 111 for further analysis. The mask_N and mask_M are computed using the sequence numbers N and M< respectively using the process discussed above. As a non-limiting example, the mirroring instructions includes:

At S308 and S309, packets arrive from either the client device or a destination server with their sequence number that matches the mirroring instructions and are mirrored to the central controller 111 for buffering and for analysis by the DPI engine 312. It should be noted that each instruction hit increments a counter Client-to-Server hit counter X [bytes] and Server-to-Client hit counter Y [bytes]. The flow table audit mechanism scans the flow table, every predefined time interval, and updates the mask to 0x00000000 and the ACTION to "no Action" of all entries that their Client-to-Server buffer length=TCP_DATA_SIZE_DPI or Server-to-Client buffer length=TCP_DATA_SIZE_DPI. The various fields of the flow table are shown in FIG. 2.

Figure 4:
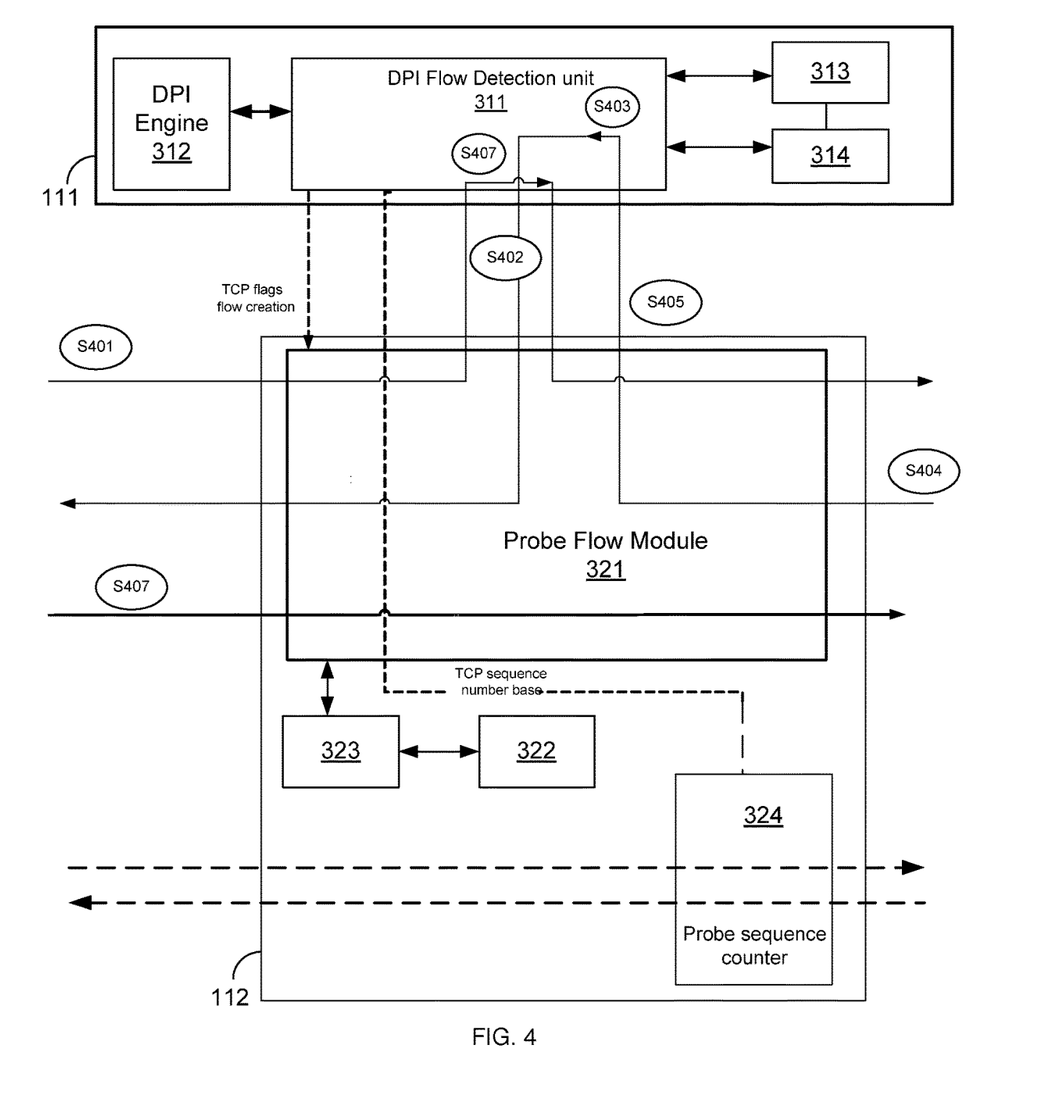
FIG. 4 is a schematic diagram of a system utilized for describing the process of flow termination as performed by a central controller and a network node according to one embodiment.

FIG. 4 show an exemplary and non-limiting diagram of a system 400 for describing the process of flow termination as performed by the central controller 111 and a network node 112 according to one embodiment. The various module of the controller 111 and node 112 are discussed with reference to FIG. 3.

In the flow termination process, the module 311 follows a termination of a TCP flow and is responsible to remove the exiting flow from the flow table. In addition, the module 311 disables or removes the mirroring instructions from the node 112. According to one embodiment, the module 311 configures the node 112 with a set of termination instructions. Examples for such instructions are provided above.

At S401, a packet arrives, at the node 112, from a client 130 with a header including the value of [TCP FLAG FIN=1]. The value matches one of the termination instructions, thus, at S402, to the packet is sent to the center controller 111.

In response, at S403, the module 311 traps the packet and marks the corresponding flow-id in the flow table to update the state to FIN. Then, the packet is sent back it to the network log.

At S404, a response packet from the destination server (e.g., server 140) with a header's value containing [TCP FLAG FIN=1, ACK=1] is received at the node 112. As the

| Match | | | | | | | | result | |
|---|---|---|---|---|---|---|---|---|---|
| Source IP address | source destination IP address | TCP port | destination TCP port | protocol number | TCP sequence | sequence mask | | action | Count byte |
| 192.1.1.1 | 209.1.4.4 | 15431 | 21 | 6 | 0xf46d5c34 | 0xFFFF8000 | | Mirror | X |
| 209.1.4.4 | 192.1.1.1 | 21 | 15431 | 6 | 0x3c98b9ab | 0xFFFF8000 | | Mirror | Y |

Referring back to FIG. 3, at S306, in the module 311 the processed packet is sent back to the node 112 for further processing. In an embodiment, a set of mirroring instructions generated respective of the computed mask value are sent to the node 112. At S307, a response TCP ACK packet with [TCP FLAG ACK=1] is received at a port of the node 112 and, based on the respective probe instruction, the packet is switched directly to the destination server 140.

In an embodiment, an audit mechanism scans the flow table every predefined time interval from the last timestamp and deletes all flows from the state is not SYN/ACK. Furthermore, an aging mechanism deletes all entries wherein their aging bit equal=1. The aging bit is initialized to 0 upon flow creation of a flow-id entry and is set to 1 in the first audit pass if buffer length is 0. When a flow-id is deleted from the flow table, the flow-id also removed from the tables maintained by the probe sequence counter 324.

value matches one of the termination instructions, at S405, to the packet is sent to the center controller 111.

At S406, the module 311 traps the received packet and marks the corresponding FLOW-ID in its flow table DB as state=FIN/FIN/ACK. Then, the packet is sent back to the network node 112. At S407, a response TCP ACK packet arrives from a client 130 with a header's value containing [TCP FLAG ACK=1] and is switched directly to the server 140. If the response packet includes the header's value of [TCP FLAG RST=1], the module 311 marks the state of respective flow id in the flow table.

In an embodiment, the audit mechanism implemented by the module 311 scans the flow table every predefined time interval to all flows that their respective state is any one of FIN, FIN/ACK, FIN/FIN/ACK, or RST. The flows are removed from the probe flow module 321 and the flow table.

Figure 5:
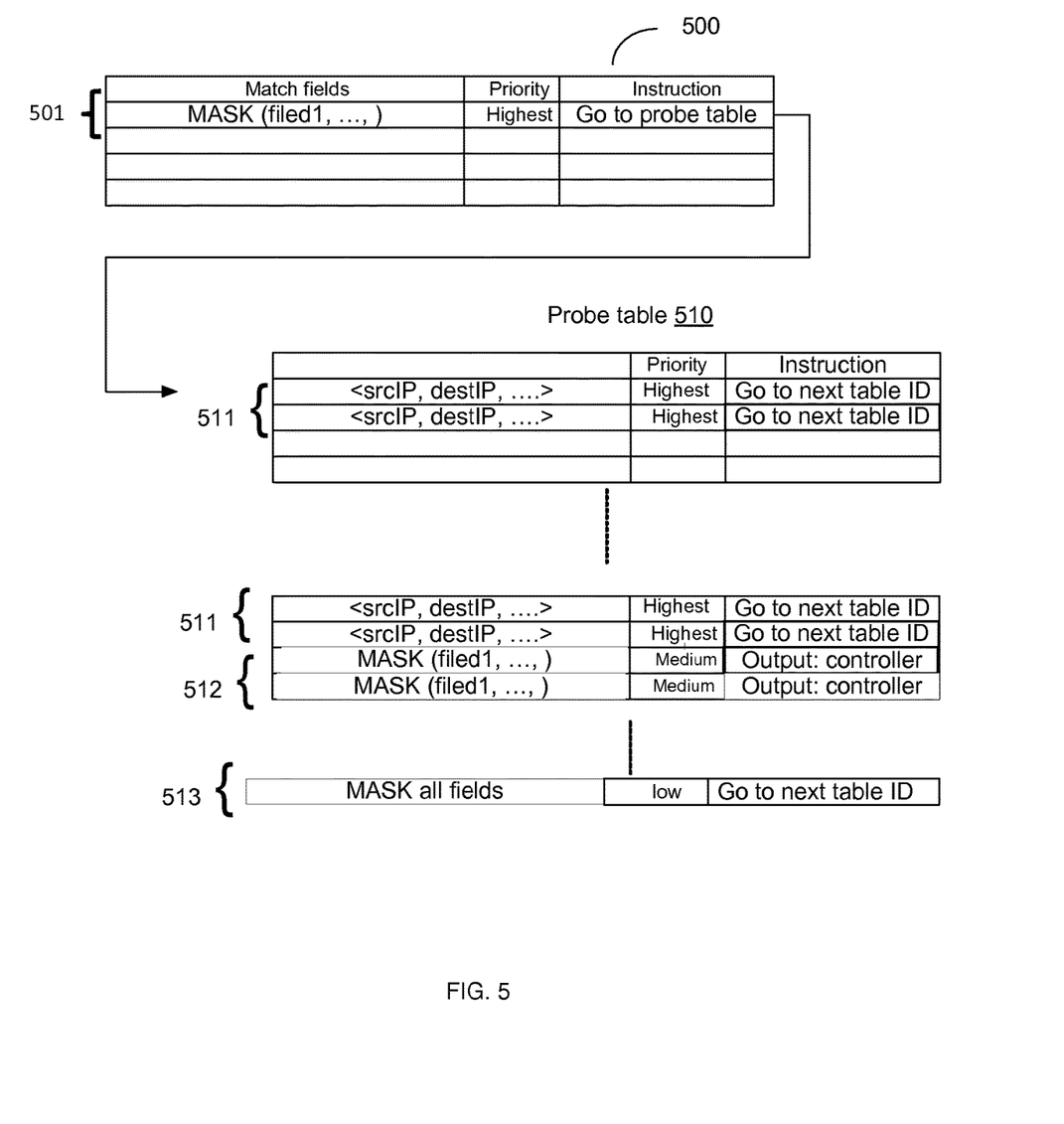
FIG. 5 is a data structure depicting the organization of flows according to one embodiment.

According to one embodiment, each network node 112 is populated with one or more probe tables generated by the central controller 111. FIG. 5 shows a non-limiting and exemplary data structure 500 depicting the organization of the flows to allow functionality of both the probe flow detection module 321 and probe sequence counter 324.

The data structure 500 which may be in a form of a table is updated with a general instruction to match all traffic type with instruction 501 to go to a probe table 510. The instruction 501 is set to the highest priority, unless the controller 111 requires pre-processing of other instructions. All packets matching the instruction 500 are processed in the probe table 510.

In an embodiment, the probe table 510 is populated with a medium priority probe and termination instructions 511 to detect all SYN, SYN/ACK, FIN, FIN/ACK that are the TCP connection initiation packets. The instructions 511 allows the module 311 to update the flow table and as a consequence create new instructions for mirroring N bytes from each TCP connection setup.

The probe table 510 table is also populated with highest priority instructions 512, these are two bi-direction instructions per flow-id that match a number 'r' tupple flow headers including the TCP sequence number as calculated by the sequence mask logic. The instructions 512 are to send the packet to the central controller 111 and also to perform go to table ID <next table ID>. The instructions 512 will cause sending the packet to continue switching processing. Each of these bi-directional instructions 512 will cause the node to copy several bytes from the TCP stream to the TCP flow analysis logic to be stored for further DPI engine metadata analysis.

The final instruction 513 placed in the probe table 510 is in the lowest priority to catch all and proceed with the switch functionality. All traffic which does not correspond to the TCP initiation packets, nor a specific detected flow and the corresponding TCP sequence number shall continue regular processing.

Figure 6:
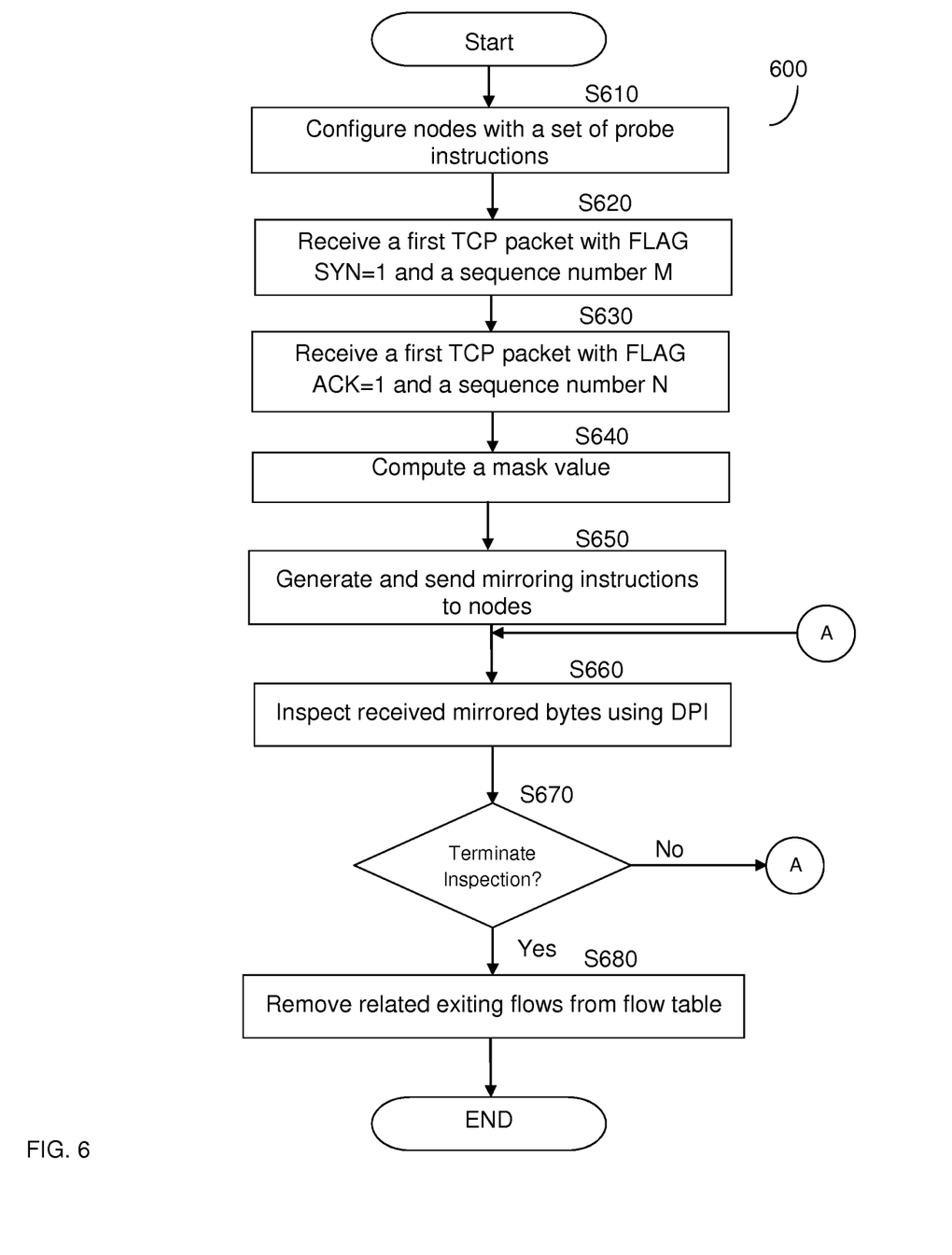
FIG. 6 is flowchart illustrating the operation of the central controller according to one embodiment.

FIG. 6 shows an exemplary and non-limiting flowchart 600 illustrating the operation of the central controller 111 according to one embodiment. At S610, all network nodes 112 are configured with a set of probe instructions utilized to instruct each node 112 to redirect a TCP packet having at least a flag value as designated in each probe instruction. Examples for probe instructions are provided above.

At S620, a first TCP packet with at least one TCP FLAG SYN value equal to 1 is received. This packet may have a sequence number M and may be sent from a client device 130. At S630, a second TCP packet with at least one TCP FLAG ACK value equal to 1 is received. This packet may have a sequence number N and may be sent from a destination server 140 in response to the first TCP packet. In an embodiment, the flow table is updated with the respective flow ID and the state of the first and second packets.

At S640, using at least the sequence numbers of the first and second packets a mask value is computed. The mask value is utilized to determine which bytes from the flow respective of the sequence numbers N and M should be mirrored by the nodes. An embodiment for computing the mask value is provided above.

At S650, a set of mirroring instructions are generated using the mirror value and sent to the network nodes. Each such instruction defines the packets (designed at least by a specific source/destination IP addresses, and TCP sequences), the number of bytes, and the bytes that should be mirrored. At S660, the received mirror bytes are inspected using a DPI engine in the controller 111. In addition, the flow table is updated with the number of the received mirror bytes.

In S670, it is checked if the inspection session should be terminated. The decision is based on the FIN and/or RST values of the TCP FLAG. As noted above, packets with TCP FLAG FIN=1 or TCP FLAG RST=1 are directed to the controller respective of the set of termination instructions. Some examples for the termination instructions are provided above. If S670, results with No answer execution returns to S660; otherwise, execution continues with S680. At S680, related exiting flows from the flow table are removed. In addition, the nodes 112 are instructed not to perform the mirroring instructions provided at S650.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any nodes developed that perform the same function, regardless of structure.

What is claimed is:

1. A method for use with a packet network including a network node for transporting packets between first and second entities under control of a controller that is external to the network node, the method comprising:

sending, by the controller to the network node over the packet network, an instruction and a packet-applicable criterion;

receiving, by the network node from the controller, the instruction and the criterion; receiving, by the network node from the first entity over the packet network, a packet addressed to the second entity;

checking, by the network node, if the packet satisfies the criterion;

responsive to the packet not satisfying the criterion, sending, by the network node over the packet network, the packet to the second entity; and responsive to the packet satisfying the criterion, sending the packet, by the network node over the packet network, to an entity that is included in the instruction and is other than the second entity.

2. The method according to claim 1, wherein the instruction is 'probe', 'mirror', or 'terminate' instruction, and upon receiving by the network node the 'terminate' instruction, the method further comprising blocking, by the network node, the packet from being sent to the second entity and to the controller.

3. The method according to claim 1, wherein the instruction is a 'probe', a 'mirror', or a 'terminate' instruction, and upon receiving by the network node the 'mirror' instruction and responsive to the packet satisfying the criterion, the method further comprising sending the packet, by the network node, to the second entity and to the controller.

4. The method according to claim 1, wherein the instruction is 'probe', 'mirror', or 'terminate' instruction, and upon receiving by the network node the 'probe' instruction and responsive to the packet satisfying the criterion, the method further comprising: sending the packet, by the network node, to the controller; responsive to receiving the packet, analyzing the packet, by the controller; sending the packet, by the controller, to the network node; and responsive to receiving the packet, sending the packet, by the network node, to the second entity.

5. The method according to claim 1, further comprising responsive to the packet satisfying the criterion and to the instruction, sending the packet or a portion thereof, by the network node, to the controller.

6. The method according to claim 5, further comprising storing the received packet or a portion thereof, by the controller, in a memory.

7. The method according to claim 5, further comprising responsive to the packet satisfying the criterion and to the instruction, sending a portion of the packet, by the network node, to the controller.

8. The method according to claim 7, wherein the portion of the packet consists of multiple consecutive bytes, and wherein the instruction comprises identification of the consecutive bytes in the packet.

9. The method according to claim 5, further comprising responsive to receiving the packet, analyzing the packet, by the controller.

10. The method according to claim 9, further for use with an application server that communicates with the controller, wherein the analyzing comprising sending the packet, by the controller, to the application server, and analyzing the packet by the application server.

11. The method according to claim 10, wherein the analyzing further comprising sending the packet after analyzing by the application server to the controller, and sending the packet, after receiving from the controller by the network node, to the second entity.

12. The method according to claim 9, wherein the analyzing comprises applying security or data analytic application.

13. The method according to claim 9, wherein the analyzing comprises applying security application that comprises firewall or intrusion detection functionality.

14. The method according to claim 9, wherein the analyzing comprises performing Deep Packet Inspection (DPI) or using a DPI engine on the packet.

15. The method according to claim 9, wherein the packet comprises distinct header and payload fields, and wherein the analyzing comprises checking part of, or whole of, the payload field.

16. The method according to claim 1, wherein the packet comprises distinct header and payload fields, the header comprises one or more flag bits, and wherein the packet-applicable criterion is that one or more of the flag bits is set.

17. The method according to claim 16, wherein the packet is an Transmission Control Protocol (TCP) packet, and wherein the one or more flag bits comprises comprise a SYN flag bit, an ACK flag bit, a FIN flag bit, a RST flag bit, or any combination thereof.

18. The method according to claim 1, wherein the packet comprises distinct header and payload fields, the header comprises at least the first and second entities addresses in the packet network, and wherein the packet-applicable criterion is that the first entity address, the second entity address, or both match a predetermined address or addresses.

19. The method according to claim 18, wherein the addresses are Internet Protocol (IP) addresses.

20. The method according to claim 1, wherein the packet is an Transmission Control Protocol (TCP) packet that comprises source and destination TCP ports, a TCP sequence number, and a TCP sequence mask fields, and wherein the packet-applicable criterion is that the source TCP port, the destination TCP port, the TCP sequence number, the TCP sequence mask, or any combination thereof, matches a predetermined value or values.

21. The method according to claim 1, wherein the packet network comprises a Wide Area Network (WAN), Local Area Network (LAN), the Internet, Metropolitan Area Network (MAN), Internet Service Provider (ISP) backbone, datacenter network, or inter-datacenter network.

22. The method according to claim 1, wherein the first entity is a server device and the second entity is a client device, or wherein the first entity is a client device and the second entity is a server device.

23. The method according to claim 22, wherein the server device comprises a web server, and wherein the client device comprises a smartphone, a tablet computer, a personal computer, a laptop computer, or a wearable computing device.

24. The method according to claim 22, wherein the communication between the network node and the controller is based on, or uses, a standard protocol.

25. The method according to claim 24, wherein the standard protocol is according to, based on, or compatible with, an OpenFlow protocol version 1.3.3 or 1.4.0.

26. The method according to claim 25, wherein the instruction comprises a Type-Length-Value (TLV) structure.

27. The method according to claim 1, wherein the network node comprises a router, a switch, or a bridge.

28. The method according to claim 1, wherein the packet network is an Internet Protocol (IP) network, and the packet is an IP packet.

29. The method according to claim 28, wherein the packet network is an Transmission Control Protocol (TCP) network, and the packet is an TCP packet.

30. The method according to claim 1, further comprising:
receiving, by the network node from the first entity over the packet network, one or more additional packets;
checking, by the network node, if any one of the one or more additional packets satisfies the criterion;
responsive to an additional packet not satisfying the criterion, sending, by the network node over the packet network, the additional packet to the second entity; and
responsive to the additional packet satisfying the criterion, sending the additional packet, by the network node over the packet network, in response to the instruction.

31. The method according to claim 1, wherein the packet network is a Software Defined Network (SDN), the packet is routed as part of a data plane and the network node communication with the controller serves as a control plane.

32. A method for use with a packet network including a network node for transporting packets between first and second entities under control of a controller that is external to the network node, the method by the network node comprising:
receiving, from the controller, the instruction and the criterion;
receiving, from the first entity over the packet network, a packet addressed to the second entity;
checking if the packet satisfies the criterion; responsive to the packet not satisfying the criterion, sending over the packet network, the packet to the second entity; and
responsive to the packet satisfying the criterion, sending the packet over the packet network, to an entity that is included in the instruction and is other than the second entity.

33. The method according to claim 32, wherein the instruction is 'probe', 'mirror', or 'terminate' instruction, and upon receiving the 'terminate' instruction, the method further comprising blocking, the packet from being sent to the second entity and to the controller.

34. The method according to claim 32, wherein the instruction is a 'probe', a 'mirror', or a 'terminate' instruction, and upon receiving the 'mirror' instruction and responsive to the packet satisfying the criterion, the method further comprising sending the packet to the second entity and to the controller.

35. The method according to claim 32, wherein the instruction is 'probe', 'mirror', or 'terminate' instruction, and upon receiving the 'probe' instruction and responsive to the packet satisfying the criterion, the method further comprising: sending the packet to the controller; receiving the packet, from the controller; and responsive to receiving the packet, sending the packet, to the second entity.

36. The method according to claim 32, further comprising responsive to the packet satisfying the criterion and to the instruction, sending the packet or a portion thereof to the controller.

37. The method according to claim 36, further comprising responsive to the packet satisfying the criterion and to the instruction, sending a portion of the packet to the controller.

38. The method according to claim 37, wherein the portion of the packet consists of multiple consecutive bytes, and wherein the instruction comprises identification of the consecutive bytes in the packet.

39. The method according to claim 32, wherein the packet comprises distinct header and payload fields, the header comprises one or more flag bits, and wherein the packet-applicable criterion is that one or more of the flag bits is set.

40. The method according to claim 39, wherein the packet is an Transmission Control Protocol (TCP) packet, and wherein the one or more flag bits comprises comprise a SYN flag bit, an ACK flag bit, a FIN flag bit, a RST flag bit, or any combination thereof.

41. The method according to claim 32, wherein the packet comprises distinct header and payload fields, the header comprises at least the first and second entities addresses in the packet network, and wherein the packet-applicable criterion is that the first entity address, the second entity address, or both match a predetermined address or addresses.

42. The method according to claim 41, wherein the addresses are Internet Protocol (IP) addresses.

43. The method according to claim 32, wherein the packet is an Transmission Control Protocol (TCP) packet that comprises source and destination TCP ports, a TCP sequence number, and a TCP sequence mask fields, and wherein the packet-applicable criterion is that the source TCP port, the destination TCP port, the TCP sequence number, the TCP sequence mask, or any combination thereof, matches a predetermined value or values.

44. The method according to claim 32, wherein the packet network comprises a Wide Area Network (WAN), Local Area Network (LAN), the Internet, Metropolitan Area Network (MAN), Internet Service Provider (ISP) backbone, datacenter network, or inter-datacenter network.

45. The method according to claim 32, wherein the first entity is a server device and the second entity is a client device, or wherein the first entity is a client device and the second entity is a server device.

46. The method according to claim 45, wherein the server device comprises a web server, and wherein the client device comprises a smartphone, a tablet computer, a personal computer, a laptop computer, or a wearable computing device.

47. The method according to claim 45, wherein the communication with the controller is based on, or uses, a standard protocol.

48. The method according to claim 47, wherein the standard protocol is according to, based on, or compatible with, an OpenFlow protocol version 1.3.3 or 1.4.0.

49. The method according to claim 48, wherein the instruction comprises a Type-Length-Value (TLV) structure.

50. The method according to claim 32, wherein the network node comprises a router, a switch, or a bridge.

51. The method according to claim 32, wherein the packet network is an Internet Protocol (IP) network, and the packet is an IP packet.

52. The method according to claim 51, wherein the packet network is a Transmission Control Protocol (TCP) network, and the packet is an TCP packet.

53. The method according to claim 32, further comprising: receiving, from the first entity over the packet network, one or more additional packets; checking, if any one of the one or more additional packets satisfies the criterion; responsive to an additional packet not satisfying the criterion, sending over the packet network, the additional packet to the second entity; and responsive to the additional packet satisfying the criterion, sending the additional packet over the packet network, in response to the instruction.

54. The method according to claim 32, wherein the packet network is a Software Defined Network (SDN), the packet is routed as part of a data plane and the communication with the controller serves as a control plane.

* * * * *

(12) INTER PARTES REVIEW CERTIFICATE (3877th)

United States Patent (10) Number: US 10,652,111 K1
Barsheshet et al. (45) Certificate Issued: Feb. 12, 2025

(54) METHOD AND SYSTEM FOR DEEP PACKET INSPECTION IN SOFTWARE DEFINED NETWORKS

(71) Applicants: Yossi Barsheshet; Simhon Doctori; Ronen Solomon (72) Inventors: Yossi Barsheshet; Simhon Doctori; Ronen Solomon (73) Assignee: ORCKIT IP, LLC

Trial Numbers:

IPR2023-00554 filed Feb. 21, 2023
IPR2024-00037 filed Oct. 11, 2023

Inter Partes Review Certificate for:

Patent No.: 10,652,111
Issued: May 12, 2020
Appl. No.: 15/126,288
Filed: Sep. 15, 2016

The results of IPR2023-00554 joined with IPR2024-00037 are reflected in this inter partes review certificate under 35 U.S.C. 318(b).

INTER PARTES REVIEW CERTIFICATE
U.S. Patent 10,652,111 K1
Trial No. IPR2023-00554
Certificate Issued Feb. 12, 2025

AS A RESULT OF THE INTER PARTES REVIEW PROCEEDING, IT HAS BEEN DETERMINED THAT:

Claims 1-9, 12-24 and 27-31 are found patentable.

* * * * *